March 9, 1926.  1,576,089

E. G. BURNS

UNIVERSAL JOINT

Filed March 10, 1925   2 Sheets-Sheet 1

INVENTOR.
ELMER G. BURNS
BY
ATTORNEYS.

March 9, 1926.  1,576,089
E. G. BURNS
UNIVERSAL JOINT
Filed March 10, 1925    2 Sheets-Sheet 2
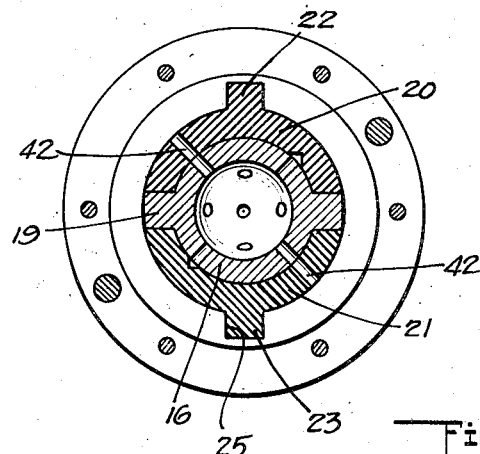
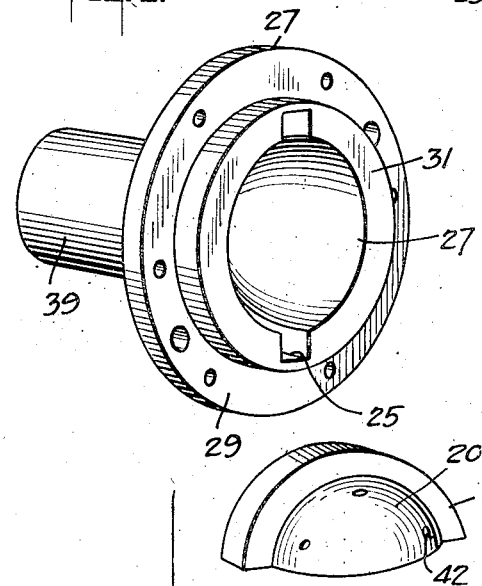
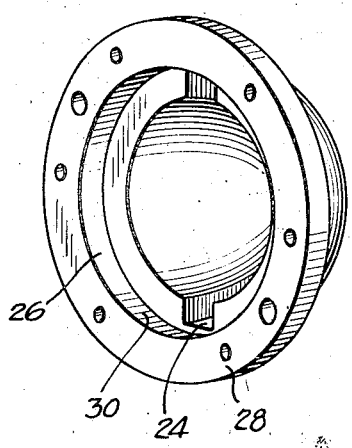
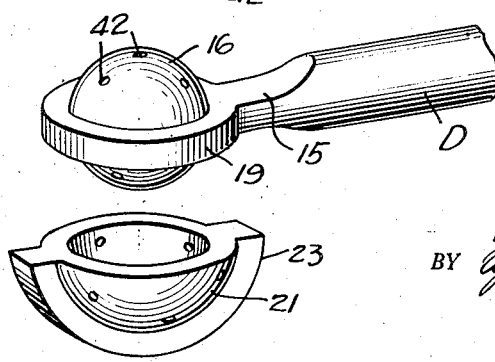
INVENTOR.
ELMER G. BURNS
BY Munn&Co.
ATTORNEYS.

Patented Mar. 9, 1926.

1,576,089

UNITED STATES PATENT OFFICE.

ELMER G. BURNS, OF LOS ANGELES, CALIFORNIA.

UNIVERSAL JOINT.

Application filed March 10, 1925. Serial No. 14,510.

*To all whom it may concern:*

Be it known that I, ELMER G. BURNS, a citizen of the United States, and a resident of Los Angeles, in the county of Los Angeles and State of California, have invented certain new and useful Improvements in Universal Joints, of which the following is a specification.

My invention relates to and has for its purpose the provision of a universal joint of extremely simple, inexpensive and durable construction which effectively operates to connect a driving shaft and a driven shaft in such manner as to permit true universal movement of either shaft yet maintains a driving connection between the two.

It is also a purpose of my invention to provide a universal joint which embodies ball and socket element associated to provide relative large and substantial bearing surfaces so as to effectively withstand the severe strains and stresses to which they are subjected when in use.

Another purpose of my invention is the provision of a universal joint of the above described character having ports and passages therein by means of which a thorough lubrication of all the moving parts of the joint can be effected.

I will describe only one form of universal joint embodying my invention, and will then point out the novel features thereof in claims.

In the accompanying drawings—

Figure 3 is a central vertical section of the joint as illustrated in Figure 2.

Figures 4 and 5 are perspective views showing the two sections of a housing comprised in the joint shown in preceding views.

Figure 6 is a dis-assembled view showing in perspective the ball and socket members comprised in the joint shown in the preceding views.

Similar reference characters refer to similar parts in each of the several views.

Figure 1:
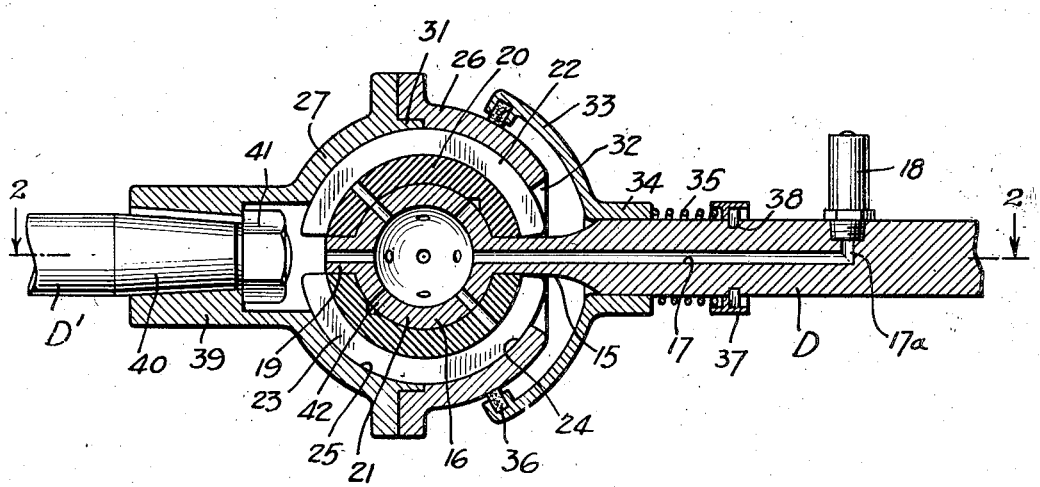
Figure 1 is a view showing in longitudinal section one form of universal joint embodying my invention.

Referring specifically to the drawings, particularly to Figure 1, my invention in its present embodiment is shown as comprising a driven shaft D provided at one end with a flattened portion or neck 15 the free end of said shaft being formed with a ball head 16, hollow to permit the supply of a lubricant thereto through a duct 17 extending longitudinally through the shaft and then radially as indicated at 17ª for communication with a conventional form of valved oil cup 18. As illustrated to advantage in Figure 6, the ball head 16 is formed with an annular flange 19, and embracing the ball at opposite sides of the frame is a two-part spherical socket comprising sections 20 and 21 each of which is formed with arcuate flanges 22 and 23, respectively. These flanges 22 and 23 are adapted to have sliding fit within grooves 24 and 25 of the hollow semi-spherical sections 26 and 27 of a two-part housing.

Figure 2:
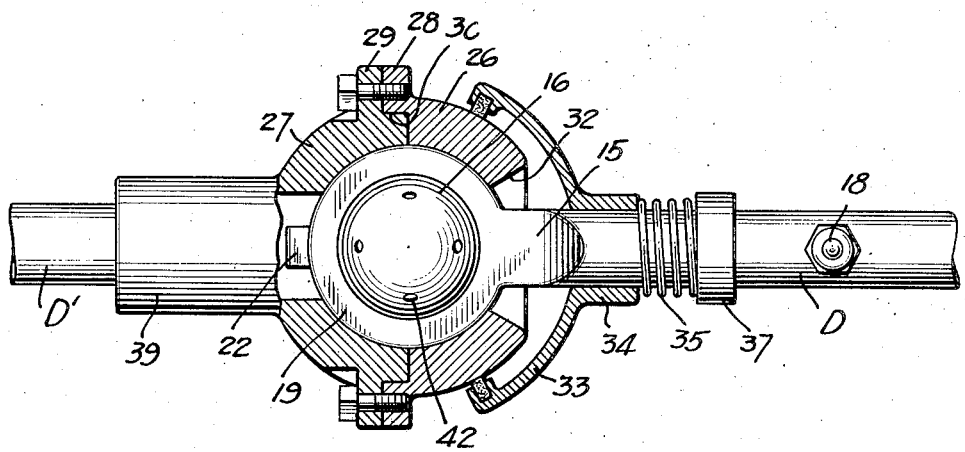
Figure 2 is a longitudinal sectional view taken on the line 2—2 of Figure 1.

As shown in Figures 4 and 5, the sections 26 and 27 are formed with annular connecting flanges 28 and 29 which are secured together as illustrated in Figure 2 thereby maintaining the sections of the housing in spherical formation so as to completely house the ball and socket members. The housing section 28 is recessed as indicated at 30 to receive an annular collar 31 formed on the section 27 whereby an interfitting of the confronting sides of the sections is effected to maintain a fluid-tight connection between the two.

As shown in Figure 1, the housing section 26 is formed with an opening 32 through which the flattened neck 15 extends. This opening is of sufficient size to allow the necessary lateral movement of the neck 15, but is at all times spanned by a hood 33 having a collar 34 slidably mounted on the shaft D and engaged by an expansible spring 35 by which the hood is normally urged in the direction of the housing so as to maintain a dust insulating strip 36 of suitable material in contact with the outer surface of the housing section 26. The spring 35 is interposed between the collar 34 and a removable collar 37 secured thereon by a split ring 38.

The housing section 27 is provided with a tubular extension 39 having a conical bore to receive the conical end 40 of a driving shaft D'. This conical end is keyed within the extension 39 and secured against removal by means of a nut 41 engaging the inner end of the shaft as clearly illustrated in Figure 1.

In order that the movable surfaces of the elements comprising the joint may at all times be properly lubricated, oil supplied to the ball head 16 through the duct 17 can be delivered to the outer surface of the ball, the inner surface of the socket sections 23 and 21, the outer surfaces of said sections and the inner surfaces of housing sections 26 and 27, all through the medium of orifices 42 in the ball head 16.

In the operation of the joint, rotational movement of the driving shaft D' effects rotation of the housing section 27, and as the section 26 is secured to the section 27 it will be clear that the complete housing is rotated. This rotational movement of the housing is imparted to the socket sections 20 and 21 through the co-acting grooves 24 and 25 and the flanges 22 and 23, and with rotation of the socket sections, it will be clear that such rotational movement is imparted to the ball by virtue of the fact that the flange 19 formed thereon is interposed between the socket sections 20 and 21 and at right angles to the flanges 22 and 23. Of course, with rotation of the ball head 16, the rotational movement of the driving shaft is imparted to the driven shaft D, and this driving connection can be maintained irrespective of the position of the driven shaft in respect to the driving shaft, it being manifest that the ball head 16 permits the necessary freedom of movement of the driven shaft in a horizontal plane as when viewed in Figure 1, while the socket sections 20 and 21 permit movement of the driven shaft in a vertical plane and independently of the housing section 26.

Although I have herein shown and described only one form of universal joint embodying my invention, it is to be understood that various changes and modifications may be made herein without departing from the spirit of the invention and the spirit and scope of the appended claims.

What I claim is—

1. A universal joint comprising a shaft, a hollow flanged ball formed on one end of the shaft, a two-part socket rotatably receiving the ball, flanges on the socket at right angles to the flange of the ball, a two-part housing receiving the socket parts and having grooves slidably receiving the flanges of the socket parts, said housing being provided with an opening through which said shaft extends, said shaft being provided with a duct through which oil can be supplied interiorly of said ball, and said ball and socket sections being provided with openings for delivering oil supplied to the ball to the working surfaces of said ball, socket and housing.

2. A universal joint comprising a ball provided exteriorly with a continuous flange projecting from the surface of the ball, a two-part socket embracing the ball at opposite sides of the flange so that the flange is interposed between the parts of the socket, the parts of the socket each provided exteriorly with a flange which coacts to produce a continuous flange at right angles to the ball flange, and a housing having grooves for receiving the flange of the socket.

3. A universal joint as embodied in claim 2, wherein the ball is hollow and a shaft is secured to the ball and provided with a duct through which a lubricant can be supplied interiorly of the ball, and said ball and socket having openings for delivering lubricant supplied to the ball to the working surfaces of the ball, socket and housing.

4. A universal joint comprising a shaft, a hollow flanged ball formed on one end of the shaft, a two-part socket rotatably receiving the ball, flanges on the socket at right angles to the flange of the ball, a housing receiving the socket and having grooves slidably receiving the flanges of the socket, said housing being provided with an opening through which said shaft extends, said shaft being provided with a duct through which oil can be supplied interiorly of said ball, and said ball and socket being provided with openings for delivering oil supplied to the ball to the working surfaces of said ball, socket and housing.

ELMER G. BURNS.